United States Patent [19]
Cornea et al.

[11] Patent Number: 5,716,051
[45] Date of Patent: Feb. 10, 1998

[54] ONE-PIECE SEAL WITH FASTENING SECTION AND SEALING SECTION

[75] Inventors: Marius Cornea, Lohr/Main; Lorenz Lippert, Gemünden/Main, both of Germany

[73] Assignee: Mannesmann Rexroth GmbH, Lohr am Main, Germany

[21] Appl. No.: 899,747

[22] Filed: Jul. 24, 1997

Related U.S. Application Data

[63] Continuation of Ser. No. 591,394, Jan. 25, 1996, abandoned.

[30] Foreign Application Priority Data

Feb. 9, 1995 [DE] Germany ............ 195 04 186.0

[51] Int. Cl.⁶ .................................... F16J 15/06
[52] U.S. Cl. .............. 277/9.5; 277/11; 277/166; 277/189; 277/181
[58] Field of Search ............... 277/9.5, 11, 166, 277/179, 181, 189, 235 B; 49/492.1, 493.1

[56] References Cited

U.S. PATENT DOCUMENTS

| | | |
|---|---|---|
| 2,716,787 | 9/1955 | Harris ..................... 49/492.1 |
| 2,745,521 | 5/1956 | White ....................... 277/166 |
| 3,139,784 | 7/1964 | Moorman . | 
| 3,203,304 | 8/1965 | Rapata ..................... 277/166 |
| 4,524,979 | 6/1985 | Bauder .................... 277/189 |
| 4,757,560 | 7/1988 | Grimstad .................. 277/166 |
| 4,976,896 | 12/1990 | Anderson, Jr. ............ 277/189 |
| 5,095,657 | 3/1992 | Marsh ..................... 49/492.1 |
| 5,531,573 | 7/1996 | Nokubo ..................... 277/11 |

FOREIGN PATENT DOCUMENTS

| | | |
|---|---|---|
| 632195 | 1/1995 | European Pat. Off. ........ 277/166 |
| 925153 | 3/1955 | Germany . |
| 1106122 | 5/1961 | Germany .................. 49/492.1 |
| 89120043 | 3/1990 | Germany . |
| 9108390.7 | 1/1992 | Germany . |
| 4235437 | 9/1993 | Germany . |
| 4228060 | 3/1994 | Germany . |
| 997597 | 7/1965 | United Kingdom .......... 49/492.1 |
| 1016330 | 1/1966 | United Kingdom .......... 49/492.1 |

*Primary Examiner*—Scott Cummings
*Attorney, Agent, or Firm*—Cushman Darby & Cushman IP Group of Pillsbury Madison & Sutro LLP

[57] ABSTRACT

A one-piece axial seal is provided for sealing a passage at the interface between a first component and a second component, in particular a fluid conduit or a screw hole. The seal has a fastening section, comprising a projection adapted to be pressed into a bore provided in the first component, and a sealing section. So that the axial seal can take up an exactly defined position on the first component, the sealing section is prestressed in a direction towards which the projection extends.

20 Claims, 2 Drawing Sheets

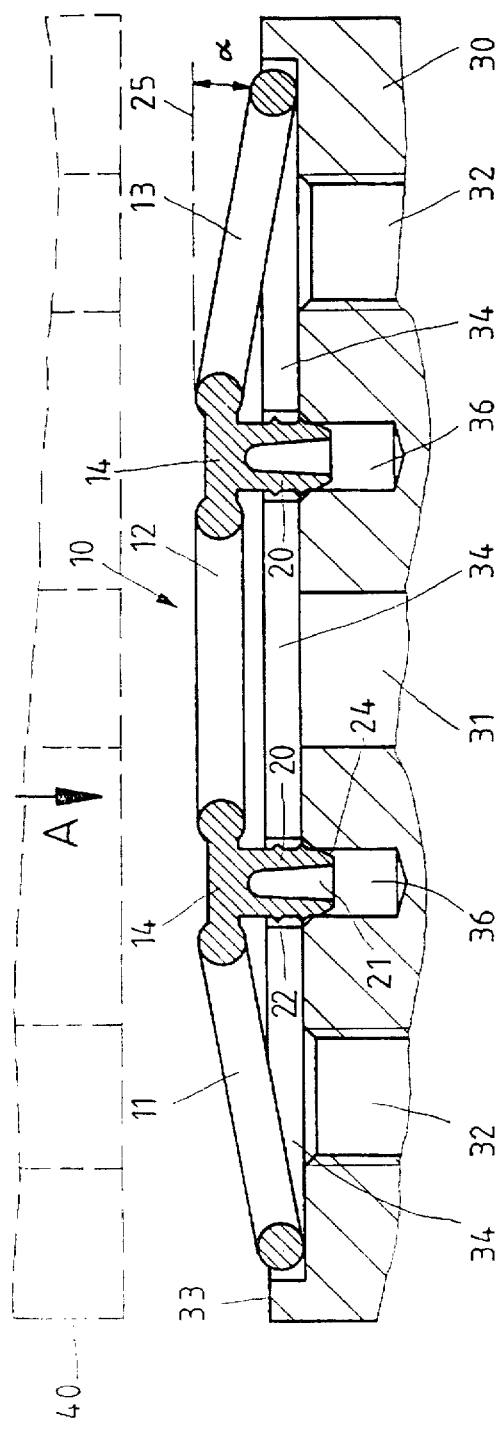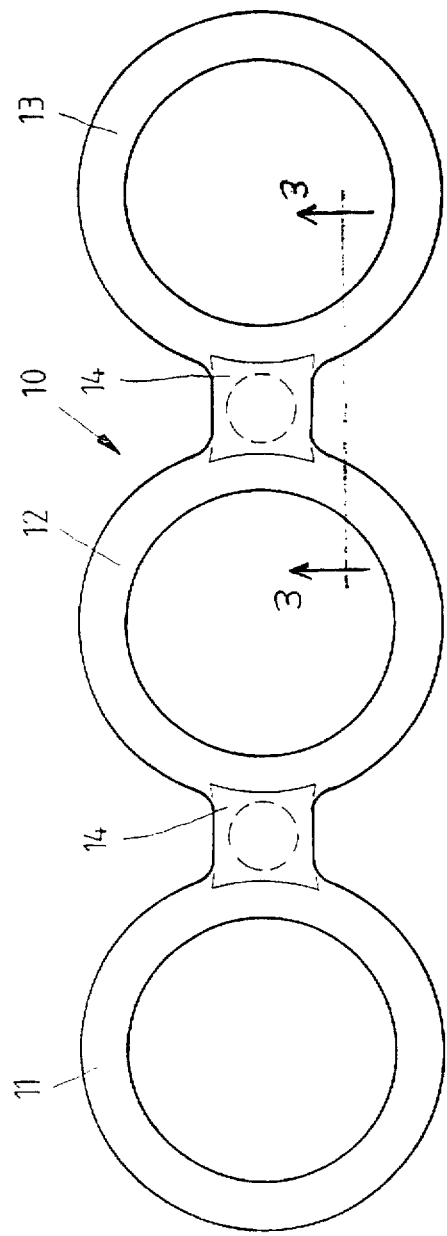

5,716,051

ONE-PIECE SEAL WITH FASTENING SECTION AND SEALING SECTION

This is a continuation of application Ser. No. 08/591,394, filed on Jan. 25, 1996, which was abandoned upon the filing hereof.

BACKGROUND OF THE INVENTION

1. Field of the Invention

The invention relates to a device for sealing passages at the interface between a first component and a second component, for example, passages such as a fluid conduit or a screw hole. The device is a one-piece construction, comprising a fastening section having a projection adapted to be pressed into a bore provided in the first component, and a sealing section.

2. Prior Art

Fluid conduits or screw holes at the interface between a first and a second component, for example, between a valve housing and a block to which the valve housing is attached, usually are sealed by means of O-rings or square rings positioned within a flat gap between the two components. In such a case the sealing rings typically are inserted into appropriately shaped recesses surrounding one of the components. The rings are not secured against loss when so disposed inasmuch as awkward handling of the component can cause them to fall out of the recesses.

An axial seal disclosed in German Patent Publication DE 42 28 060 A1 prevents such loss in connection with a sheet metal piece in that the axial seal has two projections which are pressed into two holes in the sheet metal piece. The position of the seal on the piece is established by this arrangement. If the sealing portion of the axial seal protrudes a little from the piece, this does not result in disadvantages when assembly with a second component takes place solely in a direction perpendicular to the gap between the two parts. However, it is possible, particularly when the assembly of the seal on a sheet metal piece takes place in one location and the assembly of the two parts occurs at another, that dirt particles can collect between the sealing section of the axial seal projecting from the sheet metal piece and the piece itself thereby negatively affecting the sealing action of the axial seal. A protruding sealing section is also disadvantageous when it is necessary during assembly to move the two parts, when close to one another, in a plane parallel with the gap between them because the installation space is very confined, such as often occurs in automobile construction, for example.

SUMMARY OF THE INVENTION

It is an object of the invention to provide an improved axial seal having a simplified assembly wherein secure sealing is assured.

In accordance with the invention, the sealing section of an axial seal is prestressed in the direction of a first component to which the seal is intended to be secured. This prestress is present when projection(s) of the axial seal is (are) pressed into a corresponding recess of the first component. This causes the sealing section to be pressed against the first component with a defined force to securely position it against the first component even before the two components are joined. Consequently, no dirt particles can be collected between the axial seal and the first component, at least to the extent that the seal and the component rest against each other. The position of the axial seal in respect to the first component is exactly defined so that assembly is possible without damage to, or displacement of, the axial seal, even if the installation space is confined.

Prior to being fastened to the first component, the sealing section does not fully lie in a plane extending perpendicularly to longitudinal axis of the projection(s). Instead, portions of the sealing section are inclined in respect to such plane.

When a projection is located on the outside edge of a sealing section, formed to be flat and placed in a plane with intersects a plane extending perpendicularly to the longitudinal axis of the projection, the angle between the two planes advantageously lies in a range between 5 and 15 degrees. Although the sealing section can be curved, the shaping tool becomes simpler if it lies in one plane.

If the one-piece axial seal has two adjacent sealing sections other, a projection advantageously is located in an area between the two sealing sections. If three sealing sections are placed in a row next to each other, a projection preferably is located between the center sealing section and each outside sealing section, the two outside sealing sections being prestressed in the direction toward the first component. Because the two projections are directly connected with the center sealing section, the center sealing section lies against the first component without prestressing.

When a projection is seated on a support strap formed on a sealing section, the support strap is flatter than the sealing section and is recessed on both sides in relative to the sealing section. This assures that the two components rest not against the support strap, but against the sealing section near the support strap.

Because of the design of the projection, it can be pressed into a recess of the first component with limited force, and yet, it develops a sufficiently large retaining force to hold the projection within the recess to secure the axial seal against the first component.

BRIEF DESCRIPTION OF THE DRAWINGS

An exemplary embodiment of an axial seal in accordance with the invention is represented in the drawings in association with a component on which the axial seal is to be fastened. This embodiment of the invention will be explained in detail by means of these drawings wherein:

FIG. 1 is a sectional view of an axial seal resting on a component to which it is to be secured;

FIG. 2 is a top view of the axial seal taken from the direction of the arrow A shown in FIG. 1;

DETAILED DESCRIPTION OF THE PREFERRED EMBODIMENT

Figure 3:
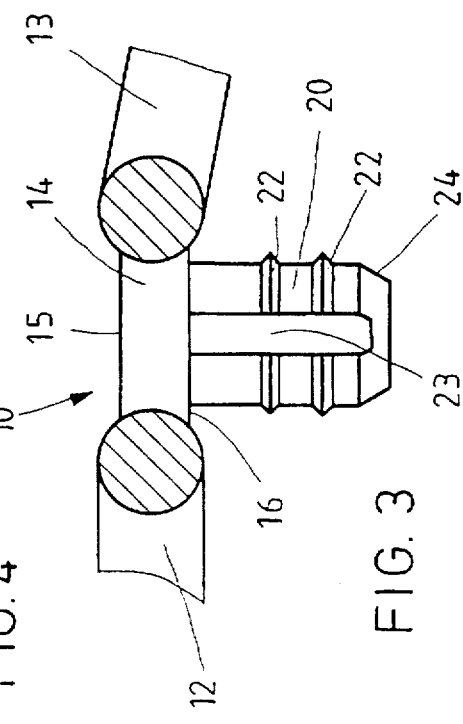
FIG. 3 is an enlarged fragmented sectional view of the axial seal taken along line 3—3 in FIG. 2.

The illustrated axial seal 10 shown, made of an elastomer material, such as rubber, has three sealing sections 11, 12 and 13, embodied as O-rings, which are connected with each other as a single piece by two straps 14 located in the axial plane of section 12 seal. As can be clearly seen in FIGS. 1 and 3, the straps 14 are flatter than the O-rings 11, 12 and 13 and are recessed with respect to the O-rings with their flat surfaces 15 and 16 (FIG. 3) extending parallel to the plane of the central O-ring 12.

Each strap 14 is used as a support for a projection 20 which is formed integral with the support strap 14 and which projects away from it on one side. The projections 20 are of substantially cylindrical shape and each has a hollow space 21 (FIG. 1) open on its free end which conically tapers towards the strap 14, by a distance which extends substantially the entire length of the projection. Each projection 20 is provided on its exterior with four ribs 22, triangular in cross section, arranged in spaced pairs at different distances along the projection. The ribs of each pair lie in substantially the same plane. Each projection 20 is provided with a chamfered bevel 24 at its free distal end.

Additionally, each projection 20 is provided on its exterior with longitudinally extending grooves 23 (FIG. 3) which are located diametrically opposite each other between the ends of ribs 22.

In FIG. 1, although the axial seal 10 rests at its ends on a component 30 to which it is to be fastened, the seal is in an unstressed condition. The central O-ring 12 lies in a plane parallel to a plane 25 which extends perpendicularly to the axes of the projections 20. In this unstressed condition, the two outer O-rings 11 and 13 are inclined in the direction towards which the projections 20 extend, the angle α between plane 25 and the planes of the O-rings 11 and 13 being approximately 10 degrees in the exemplary embodiment.

Figure 4:
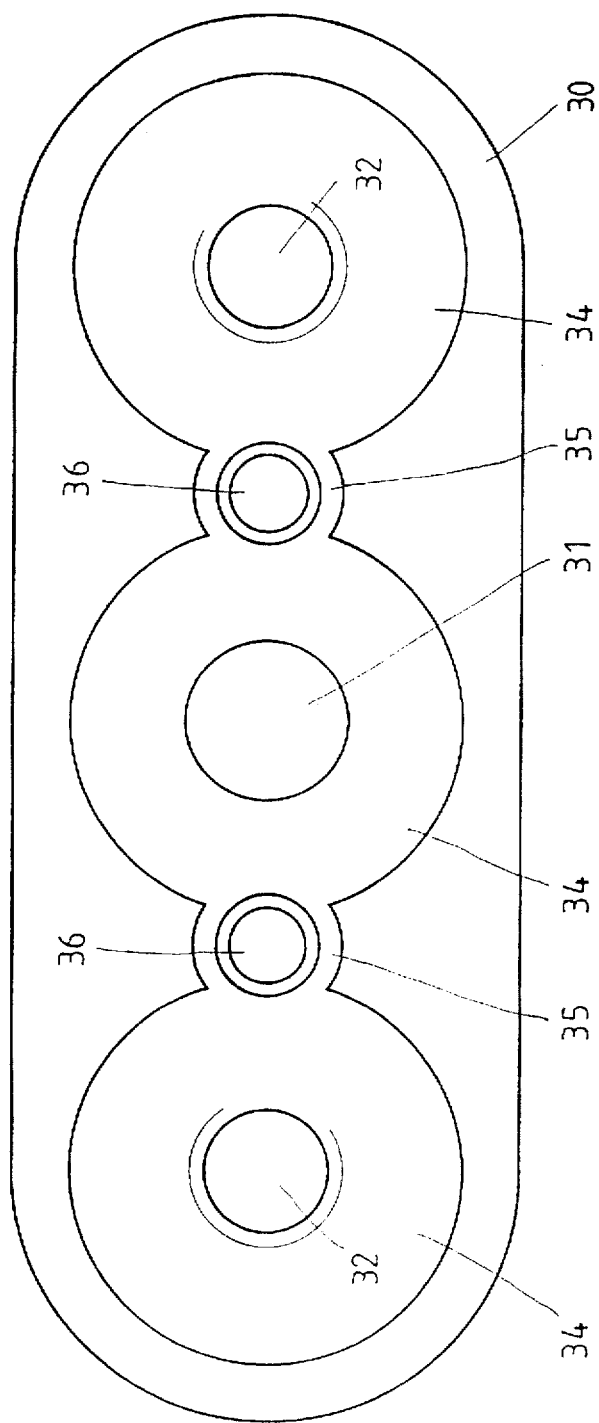
FIG. 4 is a top view of the component, without the seal, taken from the direction of the arrow A in FIG. 1.

The illustrated component 30 has a conduit 31 for pressurized fluid and two threaded bores 32 located diametrically opposite each other in respect to the conduit 31. Conduit 31 and the threaded bores 32 are open on the side 33 of component 30 against which a second component 40 (indicated by dash lines in FIG. 1) is intended to be fastened. When such fastening occurs, the conduit 31 of the first component 30 mates with a corresponding conduit in the second component. Bores of the second component also are located opposite the threaded bores 32 of component 30, and machine bolts (not shown) can be screwed through them into the threaded bores 32. On surface 33, each opening 31 and 32 of component 30 is surrounded by a cylindrical recess 34 (FIG. 4) dimensioned to accommodate a respective O-ring 11, 12 or 13. In the state where they are not compressed, the O-rings of the axial seal are thicker than the depth of the recesses 34. Grooved depressions 35 also are formed in component 30 extending between the recesses 34, and bores 36 are cut in the component 30 within the depressions.

The diameters of the bores 36 correspond to the diameters of the projections 20 at the base of the ribs 22. When the projections 20 are pressed into bores 36, the axial seal 10 is deformed in two ways. First, each projection 20 is compressed because of ribs 22 engaging the wall of the smaller diameter bore 36. This compression is possible because of the hollow space 21 in each projection. Then, from their inclined positions, the two outer O-rings 11 and 13 are displaced to the same plane as the center O-ring 12 whereby they rest flush against the component 30 under a defined prestress force. The holding force of the projections 20 is greater than this prestress force, so the projections remain in the bores 36. Air contained inside the bores is permitted to escape to the outside along the longitudinal grooves 23 of the projections when the projections are pressed into the bores.

What is claimed is:

1. A one-piece axial seal for sealing a passage at the interface between a first component and a second component, said seal comprising:

a fastening section having a projection adapted to be pressed into a bore in the first component; and a sealing ring normally deflected in a direction towards which the projection extends, the sealing ring being located in a plane which forms an acute angle with a plane extending perpendicularly to a longitudinal axis of the projection and being adapted to overlay in surrounding relationship a passage in the first component which is spaced from said bore.

2. An axial seal in accordance with claim 1, wherein said angle is between 5 and 15 degrees.

3. An axial seal in accordance with claim 1 or 2, wherein the sealing section is formed as a sealing ring and the projection is connected with an exterior portion of the ring.

4. An axial seal in accordance with claim 3, comprising two sealing sections, the projection being located in an area between the two sealing sections.

5. An axial seal in accordance with claim 3, comprising three sealing sections disposed adjacent one another, a projection being located between the centermost sealing section and each of the outermost sealing sections, and the two outermost sealing sections being deflected in the direction towards which the projections extend.

6. An axial seal in accordance with claim 3, wherein the projection is located on a support strap formed on the exterior of the sealing section and wherein the strap is flatter than the sealing section and is recessed on both sides relative to the sealing section.

7. An axial seal in accordance with claim 1 or 2, wherein the projection has an axial hollow space which is open on at least one end.

8. An axial seal in accordance with claim 7, wherein the projection is provided with an exterior portion on which at least one rib is located radially outward of the hollow space.

9. An axial seal in accordance with claim 8, wherein the rib extends circumferentially around the projection.

10. An axial seal in accordance with claim 1 or 2, wherein the projection has at least one longitudinally extending groove on its exterior through which air can escape when the projection is pressed into the bore in the first component.

11. A one-piece axial seal for sealing a passage at the interface between a first component and a second component, said seal comprising:

a fastening section having a projection on one side thereof which is adapted to be pressed into a bore in the first component; and a sealing ring joined at its edge to the fastening section, said sealing ring normally being deflected in a direction towards which the projection extends, the deflection being such that the distance of the sealing ring from a plane extending perpendicularly in respect to a longitudinal axis of the projection changes from where the edge of the sealing ring is joined to the fastening section to the edge at the opposite side of the ring, said ring being adapted to overlay in surrounding relationship a passage in the first component which is spaced from said bore.

12. An axial seal in accordance with claim 11, wherein the sealing ring is located in a plane which forms an acute angle with a plane extending perpendicularly to a longitudinal axis of the projection.

13. An axial seal in accordance with claim 12, wherein said angle is between 5 and 15 degrees.

14. An axial seal in accordance with claim 11, comprising two sealing rings, the projection being located in an area between the two sealing rings.

15. An axial seal in accordance with claims 11 or 12, comprising three sealing rings disposed adjacent one another, a projection being located between the centermost sealing ring, and the two outermost sealing rings extending in a direction towards which the projections extend.

16. An axial seal in accordance with claims 11 and 12, wherein the projection is located on a support strap formed on the exterior of the sealing ring and wherein the strap is flatter than the sealing ring and is recessed on both sides relative to the sealing ring.

17. An axial seal in accordance with claim 11 or 12, wherein the projection has an axial hollow space which is open on at least one end.

18. An axial seal in accordance with claim 17, wherein the projection is provided with an exterior portion on which at least one rib is located radially outward of the hollow space.

19. An axial seal in accordance with claim 18, wherein the rib extends circumferentially around the projection.

20. An axial seal in accordance with claim 11 or 12, wherein the projection has at least one longitudinally extending groove on its exterior through which air can escape when the projection is pressed into the bore in the first component.

* * * * *